Figure 1:
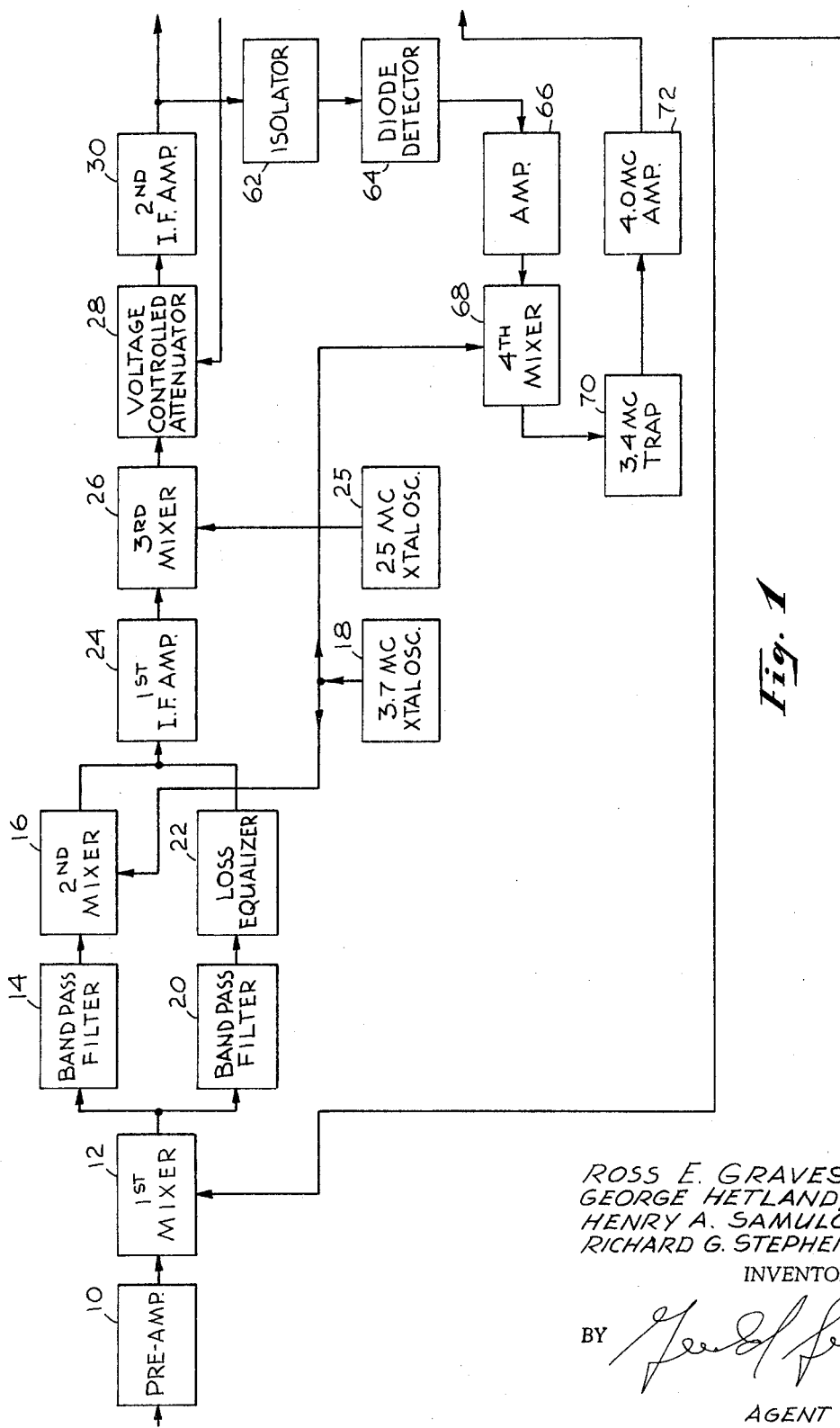

Jan. 3, 1967  R. E. GRAVES ET AL  3,296,534
HIGH-PHASE STABILITY COHERENT RADIO SIGNAL RECEIVER
Filed Sept. 25, 1962  2 Sheets-Sheet 1

ROSS E. GRAVES
GEORGE HETLAND, JR.
HENRY A. SAMULON
RICHARD G. STEPHENSON
INVENTORS

BY
AGENT

United States Patent Office 3,296,534
Patented Jan. 3, 1967

3,296,534
HIGH-PHASE STABILITY COHERENT RADIO
SIGNAL RECEIVER
Ross E. Graves, Pacific Palisades, George Hetland, Jr., Palos Verdes Estates, and Henry A. Samulon and Richard G. Stephenson, Rolling Hills Estates, Calif., assignors, by mesne assignments, to TRW Inc., a corporation of Ohio
Filed Sept. 25, 1962, Ser. No. 225,993
1 Claim. (Cl. 325—408)

This invention relates to radio frequency receivers and, more particularly, to such receivers which may be employed in coherent signal detecting and tracking systems.

With the development of missiles and space vehicles, it has become necessary to provide equipment capable of locating and tracking an object in flight in order to derive precise information concerning the object's position and velocity at all times and under all conditions. Such information is particularly important where the missile or space vehicle is of the "command guidance" type which depends upon another source (usually a ground tracking station) for the control of its flight path. Furthermore, regardless of whether control of the vehicle flight path is provided internally or externally, precise information regarding the course and speed of the vehicle is needed in order that test data regarding a missile flight may be complete.

A number of systems are known for tracking moving air-borne objects. One such system utilizes a transmitter which is located on the ground for radiating an RF signal in the direction of the air-borne object and two or more spatially separated ground receiving stations for receiving signals from the air-borne object which are returned in response to the RF signal. For any pair of such ground receiving stations, there are thus in effect two separate signals, one at each station, which are received from a common source, the transponder in the air-borne object. These separately received signals may then be sent to a common point over paths of equal, or perhaps unequal, but known time delay or phase shift, so that the time delay or phase shift introduced by the respective paths from the receiving stations may be calibrated out and thus disregarded. Since the separate signals originate at a common source, they may be compared against each other to provide a measure of the range difference, i.e., the difference in the respective distances from the air-borne transponder to the separate ground receiving stations. By utilizing the relative time displacement or phase shift of the two signals in this manner, an extremely precise measurement of range difference is provided which can be used to develop desired information concerning position, velocity and acceleration of the object being tracked.

The separate signals which are compared are commonly referred to as "coherent signal" information in view of the fact that like signal components appear in each of the separate signals. The corresponding like components serve to establish the measure of phase shift which precisely indicates the range difference. Also, the continuing comparison of like components of the two signals aids in rejecting interference from noise and other extraneous signals through the correlation of the coherent signal information.

It will be appreciated from the above discussion that, although the measurement of the difference in the distances travelled by two received signals by comparison of the relative phases of the signals gives extremely accurate information regarding a particular vehicle while efficiently separating the signals from accompanying noise interference, rather stringent limitations are placed on the signal receiving systems with respect to phase shift. For example, it is most desirable that the phase shift, which is introduced by the receivers and other signal processing apparatus itself, be held at a minimum. Furthermore, it is absolutely essential that such phase shift as may be introduced in the processing of the received signals be substantially constant without regard to frequency or gain variations.

It is therefore a general object of the invention to provide a receiver having improved phase stability.

It is a further object of the invention to provide a receiver having a reduced dependence between phase shift and amplifier gain.

It is yet another object of the invention to provide a signal receiver in which the degree of amplification may be varied automatically without affecting the phase shift of the receiver to a significant degree.

It has long been customary in high-gain radio signal receivers to provide an arrangement for automatically controlling the gain of the receiver as a function of the strength of the signal being received. This feature of automatic gain control (AGC) enables the receiver to respond satisfactorily to signals which may vary over a wide range of received signal strengths. In conventional superheterodyne receivers, the AGC circuits generally apply a bias voltage to intermediate frequency (IF) amplifier stages, thus varying the over-all gain of the receiver in accordance with the signal strength of the received signal. The IF amplifier stages generally possess high gain and narrow bandwidths and include tuned circuits. While in most applications the amount of phase shift is not critical, the presence of the tuned circuits leads to a significant amount of variation in the degree of phase shift of the signal being amplified as the gain of the stage is varied in response to the AGC voltage.

The instant invention overcomes this problem and limits the phase shift of the amplified signal by providing within a high-gain receiver a separate voltage-controlled attenuator for controlling signal amplitude with maximum phase stability. Briefly, the arrangement of the invention comprises a phase-locked receiver, a number of high-gain amplifier stages, a separate voltage-controlled attenuator for permitting automatic control of signal strength over a wide range of received signal amplitudes, and narrow bandwidth filtering stages to limit the range of noise signals which may be amplified by the receiver. The placement of the automatic gain control function in a separate voltage-controlled attenuator takes advantage of the wide bandwidth in the attenuator with minimal phase shift.

The receiver of the invention may be arranged to amplify two signals having a substantially constant amplitude ratio and frequencies which are separated by a predetermined amount. The signals may be thought of as a carrier with a single sideband subcarrier caused by a modulation source. Additional modulation may be impressed on the carrier, for example, by phase modulation, with a narrow bandwidth relative to the frequency separation between the carrier and the single sideband subcarrier. The input stage of the receiver is a preamplifier designed to operate over the frequency range of the received signals. The signals are shifted in frequency and separated by different bandpass channels in which one of the signals is shifted a second time in order to place its frequency in close proximity to that of the other signal. The result of placing the frequencies of the two signals close together is to reduce the differential phase shift between them when the signals are passed through active and passive circuitry which is capable of introducing phase shifts in each of the signals separately. (In this connection, it may be noted that phase shift introduced in this manner on a signal being processed is usually a function of the frequency of the signal itself.) By thus making the two signals close together in frequency, the sensitivity to varying phase shift is reduced; and the bandwidth requirements normally imposed on the following stages are considerably less stringent. In particular, it is feasible to obtain reasonable gains from amplifier stages without excessive differential phase shift; whereas, if the degree of frequency separation were not reduced, the resultant large bandwidth requirement would limit the achievable stage gain to an undesirably low figure.

After the shifting of the signals in frequency as described, the signal paths are then joined; and the two signals are applied to the first of a number IF amplifiers for initial amplification. From the first IF amplifier the signals are applied to a third mixer where they are again shifted in frequency and applied to the voltage-controlled attenuator stage. The voltage-controlled attenuator has a maximum gain of unity and is designed to have wide bandwidth. By virtue of the wide bandwidth provided in this stage, the attenuator has an extremely low ratio of phase shift to incremental frequency change and, furthermore, provides a substantial independence between phase shift and automatic gain control of the stage. The output of the voltage-controlled attenuator is preferably amplified through second and third IF amplifiers, is phase detected, and then is applied to a voltage-controlled oscillator which in response to an input signal develops an oscillation of a frequency which is controlled thereby. This oscillation, after appropriate frequency multiplication, is fed back to the first mixer to be mixed with the incoming signals from the preamplifier. By this means, the phase and frequency of an input signal are reproduced in the waveform of an oscillator as controlled by the input signal. The control voltage for the attenuator stage is developed in a feedback loop which is connected to the output of the third IF amplifier. Other output signals from the receiver are taken off at various points therein so as to provide suitable information relative to the received signals.

By means of the separate signal-controlled attenuation stage, the maximum phase shift encountered by the received signals in passing through the receiver is maintained at a sufficiently low level which does not introduce a significant phase shift in the output signals fed from the receiver to associated portions of a tracking system. Thus, the invention permits determination of the location, velocity, or acceleration of an air-borne object with improved accuracy and efficiency.

Figure 2:
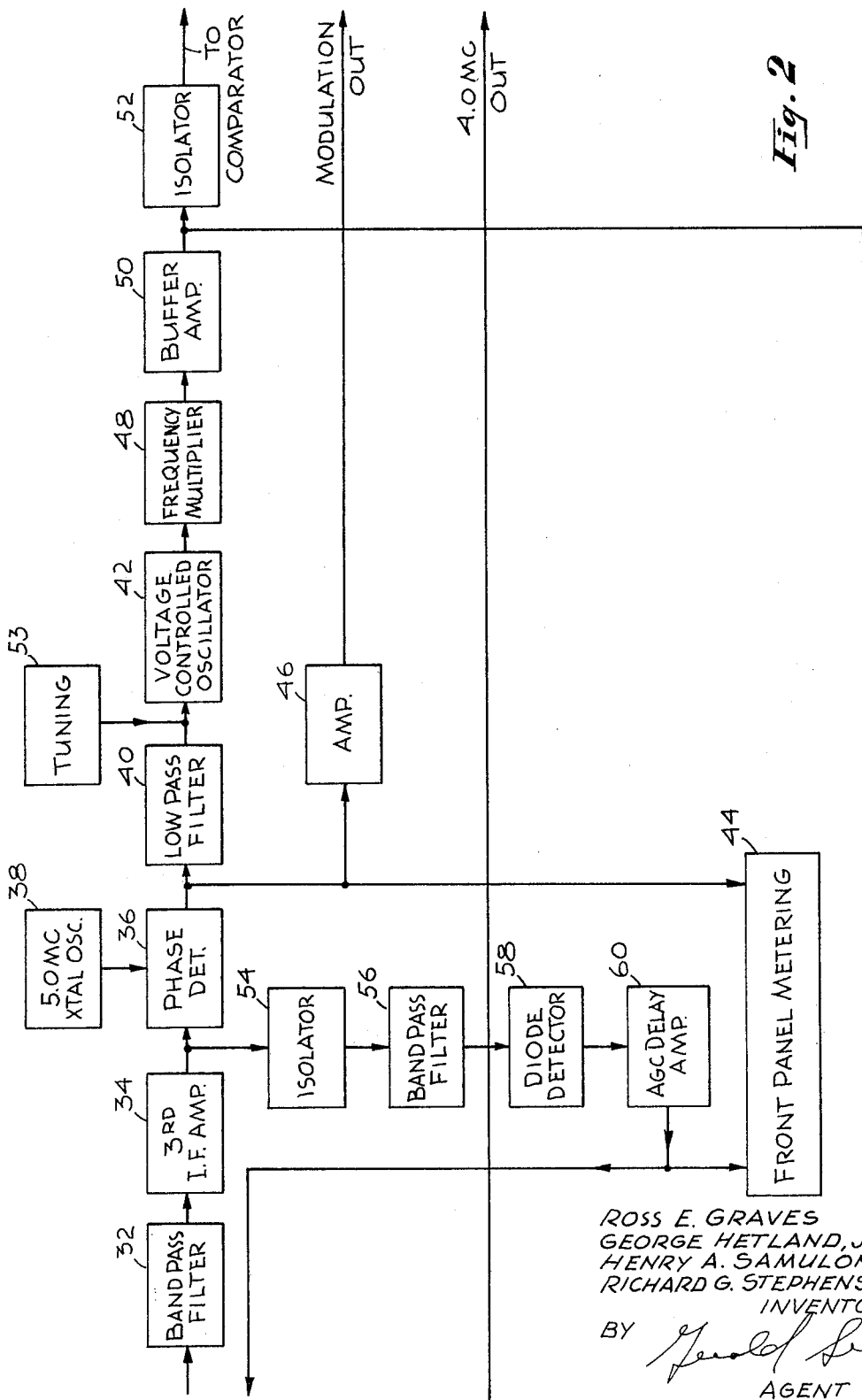

The invention may be better understood from a consideration of the following detailed description taken in conjunction with the drawings in which:

FIGS. 1 and 2 illustrate a block diagram of a particular arrangement of the invention.

In accordance with the invention there is shown in block diagram form a number of amplifying, mixing, and filtering stages, together with suitable feedback loops and a voltage-controlled oscillator which develops a signal representative in phase and frequency of the "carrier" component of the signal present at the input of the receiver. Referring now to FIG. 1, there is shown at the input side of the receiver a pre-amplifier 10 designed to amplify an input signal comprising a carrier and a subcarrier at nominal frequencies, which may be, for example, four megacycles apart. In normal operation the carrier signal is phase-modulated at a predetermined level and frequency. The output of the pre-amplifier 10 is applied to a first mixer 12 which also receives a signal of controllable phase and frequency to be mixed with the input signal. The output of the first mixer 12 may then comprise two signals of 24 megacycles (hereinafter, mc.) and 20 mc., respectively. In a first signal channel, a first bandpass filter 14, tuned to 24 mc. and having a noise bandwidth of 150 kilocycles (hereinafter, kc.) accepts the 24 mc. output of the first mixer 12 and applies it to a second mixer 16. The second mixer 16 receives a fixed frequency wave of 3.7 mc. generated by a crystal oscillator 18.

Crystal oscillator 18 is mounted in a thermostatically controlled oven which provides a stable thermal environment to minimize output frequency variations with external temperatures changes and the phase shifts which would accompany such output frequency variations. The 24 mc. signal from the bandpass filter 14 is thus shifted in the second mixer 16 by mixing with the 3.7 mc. signal to develop a different signal having a frequency of 20.3 mc. at the output of the second mixer 16.

A second signal channel including a second bandpass filter 20, also connected to the output of the first mixer 12, accepts the 20 mc. signal therefrom and directs it over a second path via a loss equalizer stage 22 to be combined with the signal from the second mixer 16 at the input of a first IF amplifier 24. Bandpass filters 14 and 20, whose purpose is to establish the desired noise bandwidths without narrowbanding in active stages and in such a way as to avoid overlapping of the two resulting noise bands at the input to IF amplifier 24, with a consequent increase in noise spectral density, are high quality quartz crystal filters, mounted in thermostatically controlled ovens which maintain carefully controlled stable thermal environments for these narrowband circuits to minimize phase variations with external temperature changes. The loss equalizer 22 insures that the level of the signal passed to the input of the first IF amplifier 24, via the bandpass filter 20, bears the same relationship to the level of the signal from the second mixer 16, as is present at the preamplifier 10. The shifting of the 24 mc. signal in the second mixer 16 advantageously permits both signals to be amplified in the same amplifier channel without requiring excessive amplifier bandwidth in order to achieve the required phase stability. Thus the first IF amplifier 24 is advantageously permitted to have a bandpass centered about a frequency of 20.15 mc. for amplifying the two signals of 20 mc. and 20.3 mc., respectively, and utilizes a broad bandwidth to minimize phase instabilities caused by environmental changes and input power variations.

From the output of the first IF amplifier 24, the signals are directed to a third mixer 26 which also receives a wave having a frequency of 25 mc. from a crystal oscillator 25. Crystal oscillator 25 is mounted in a thermostatically controlled oven to minimize frequency shifts with external temperature for the same reason as crystal oscillator 18. This causes a shift of the 20.3 mc. signal to a difference frequency of 4.7 mc., while the 20 mc. signal is transformed to a difference frequency of 5 mc. Both signals are then applied to a voltage controlled attenuator 28 which serves as the automatic gain control stage for the receiver. The voltage-controlled attenuator 28 is the subject matter of a copending application, entitled Voltage Controlled Attenuator, filed September 25, 1962, Serial No. 226,000, now abandoned, and provides output signals at a constant amplitude for a range of input levels to the voltage-controlled attenuator 28, which may vary from approximately −20 dbm to −80 dbm. A second IF amplifier 30, which is connected to the output of the voltage-controlled attenuator 28, thereby receives signals of 4.7 and 5 mc., respectively, at a substantially constant amplitude level in response to received signals, which may vary over a wide range of amplitudes. The second IF amplifier 30 is designed to have a bandwidth centered at a frequency of 4.85 mc., and utilizes a broad bandwidth to minimize phase instabilities caused by environmental changes and input power variations.

In FIG. 2, there is shown bandpass filter 32, tuned to a frequency of 5 mc. and having a noise bandwidth of 150 kc., that is connected to the output of the second IF amplifier 30. The bandpass filter 32 accepts the 5 mc. signal and directs it to a third IF amplifier 34, which is also tuned to 5 mc. Bandpass filter 32, whose purpose is to establish the desired noise bandwidth at the phase detector input without narrowbanding the active stages in IF amplifier 34, is a high quality quartz crystal filter, mounted in a thermostatically controlled oven, whose purpose is to maintain a carefully controlled stable thermal environment for this narrowband circuit to minimize phase variations with external temperature changes. The output of the third IF amplifier 34, which is the 5 mc. signal, is directed to a phase detector 36 and a voltage-controlled feedback loop for applying the AGC voltage to the voltage-controlled attenuator 28 in FIG. 1. The phase detector 36 also receives a reference signal from crystal oscillator 38, which is mounted in a thermostatically controlled oven for the same reason as oscillators 18 and 25. Phase detector 36 is mounted in a similar thermostatically controlled oven to minimize any unbalance or phase shift caused by external temperature changes.

Within the phase detector 36, the 5 mc. phase-modulated input signal, derived from the received phase-modulated carrier, is mixed with a 5 mc. oscillation from the crystal oscillator 38. The output of the phase detector is directed via a "low pass" filter 40, which serves to block the modulation frequency from the control voltage to a voltage-controlled oscillator (VCO) 42. The "low pass" filter is actually a compensation network which provides integral-plus-proportional control to VCO 42. In addition, the output of the phase detector 36 is directed to a front panel meter 44 for indicating the phase error of the receiver and also to an amplifier 46 for providing a separate output of the modulation contained on the 5 mc. input to the phase detector 36. The signal directed to the input of the VCO 42 controls the frequency and phase of the VCO in accordance with the frequency and phase of the carrier signal as detected in the phase detector 36 by virtue of comparison with the 5 mc. signal from the crystal oscillator 38. Thus, the output of the VCO 42 is a signal having a frequency which varies as a function of the input control voltage. The frequency of this signal is multiplied 9 times in a frequency multiplier 48, then directed through a buffer amplifier 50 to the first mixer 12 (FIG. 1) on the input side of the receiver. The feedback path from the buffer 50 to the first mixer 12 closes the phase-locked loop of the receiver and insures that the frequency-multiplied output of the VCO 42 follows the frequency and phase of the carrier component of the signals at the input to the receiver. A portion of the signal present at the output of the buffer 50 is also directed through an isolator 52 to a comparator which may be operated in association with the receiver. An external tuning adjustment 53 for manually controlling the VCO 42 may consist of a multi-turn potentiometer connected across a negative voltage supply. This tuning control 53 is used as required in order to acquire the signal. Once the signal is tuned in, the receiver locks onto the signal by virtue of the phase-locked loop and follows it as it may vary in frequency due to Doppler and other effects.

The automatic gain control channel, which is connected to the output of the third IF amplifier 34, is basically a D.C. amplifier which provides an AGC voltage to actuate the front panel meter 44 for monitoring signal strength and also to control the receiver gain by means of the voltage-controlled attenuator 28. In the AGC channel the signal from the third IF amplifier 34 is directed to an isolating stage 54 and thence through a bandpass filter 56 having a 1 kc. bandwidth centered at 5 mc. The output of the bandpass filter 56 is then applied to a diode detector 58, which drives the AGC delay amplifier 60. This amplifier has a net gain of approximately 24 db and has a slowly varying D.C. signal output which is applied to both the front panel metering section 44 and to the voltage-controlled attenuator 28 to thereby vary the attenuation thereof in accordance with the strength of the signal developed at the output of the third IF amplifier 34. Alternatively, the non-coherent AGC loop herein described can be replaced by a coherent AGC loop in which the signal into the AGC delay amplifier 60 is obtained by phase detecting the output of the isolator 54 against a reference signal obtained by phase-shifting the output of 5 mc. oscillator 38 by 90 degrees. Details of the implementation of this coherent AGC circuit are omitted as they will be obvious to those skilled in the art.

A second output is taken from the second IF amplifier 30 (FIG. 1) through an isolator stage 62 after which this portion of the signal is detected and amplified in a diode detector 64 and an amplifier 66. These stages are connected in what may be called a data extraction channel. As received from the second IF amplifier 30, the signal consists of two components, a carrier signal component of 5 mc., and a sub-carrier signal component of 4.7 mc. The diode detector 64 mixes the two component signals to develop a difference frequency of 300 kc. After amplification in the amplifier stage 66, the 300 kc. signal is mixed with a second output at 3.7 mc. received from the crystal oscillator 18 in a fourth mixer 68. The mixer products of the fourth mixer 68 include output signals of 4 mc., 3.4 mc., and 4.3 mc. The 4 mc. signal is applied to the input of a 4 mc. amplifier 72, the output of which is provided as an external output of the receiver. Between the fourth mixer 68 and the amplifier 72 is a 3.4 mc. trap 70 which attenuates the 3.4 mc. mixer product output signal to a level which is negligible in comparison with the 4 mc. signal. The amplifier 72 itself provides at least 40 db of attenuation to all frequencies except the 4 mc. signal, so that the output thereof is substantially free of all the other signals from the fourth mixer 68. The use of the 3.7 mc. crystal oscillator 18 to provide mixing signals to both the second mixer 16 and the fourth mixer 68 insures the requisite synchronization of these two stages, since any phase shifts which may be introduced in the second mixer 16 from its local oscillator 18 are cancelled out in the fourth mixer 68 which uses the same local oscillator.

As the level of signals received at the input of the receiver increase, the AGC voltage which is developed in the AGC delay amplifier 60 becomes more negative. This increasingly changes the operating point of the voltage-controlled attenuator 28. Any change that occurs in the AGC voltage results in a change of the gain function of the voltage-controlled attenuator 28 by virtue of affecting the gains of the respective stages. The gain function of the voltage-controlled attenuator 28 is designed such that a signal at a constant level of zero dbm is presented to the input of the phase detector 36 input signal levels varying over a dynamic range of 60 db. This wide range of gain control is afforded with a negligible change of phase shift over the range of operation of the attenuator. This advantageous result is provided in accordance with the invention through the use of separate attenuator stages having low Q circuits to achieve a wide bandwidth and, thus, a small phase shift per increment of frequency change, together with particular compensating circuits to maintain the change of input impedance in the attenuating stages at a substantially zero level. By virtue of the described arrangements, the invention provides a coherent receiver achieving the requisite degree of amplification of received signals with a negligibly small change of phase shift over a very wide range of signal level of received signals in order that the successful tracking of air-borne objects, such as missiles and space vehicles, may be effected with increased precision and efficiency.

Although there has been described above a particular arrangement of a phase-stabilized coherent receiver, in accordance with the invention and for the purpose of illustrating the manner in which the invention may be used to advantage, it will be appreciated that the invention is not limited thereto. Accordingly, any and all modifications, variations or equivalent arrangements falling within the scope of the annexed claim should be considered to be a part of the invention.

What is claimed is:

A phase-locked receiver for amplifying signals with a minimum degree of phase shift comprising:

signal mixing means, first and second channels connected in parallel to the output of the mixing means, signal shifting means in the first channel for reducing the differential phase shift by changing the frequency of the signal carried by the first channel to approach the frequency of the signal carried by the second channel, tuned frequency amplifying means having substantially fixed gain connected to the output of the first and second channels, said tuned frequency amplifying means having a fixed gain and frequency characteristic, a voltage-controlled attenuator having a wide band width connected in series with the amplifying means for varying the degree of attenuation of recived signals without changing the phase relationship of signals passing therethrough, bias voltage developing means connected to the output of the amplifying means for applying a voltage to the voltage-controlled attenuator which is proportional to the strength of received signals, phase detecting means connected to the amplifying means, and a voltage-controlled oscillator responsive to the output of the phase detecting means for generating an output signal coresponding in phase and frequency to the received signal.

References Cited by the Examiner
UNITED STATES PATENTS

| | | | |
|---|---|---|---|
| 2,017,523 | 10/1935 | Beers | 325—400 |
| 2,298,629 | 10/1942 | Schaper | 330—91 X |
| 2,394,544 | 2/1946 | Gottier | 325—330 X |
| 2,602,864 | 7/1952 | Bagley | 330—96 X |
| 2,636,939 | 4/1953 | Wissel et al. | 325—411 |
| 2,794,909 | 6/1957 | Berg | 325—485 |
| 3,045,114 | 7/1962 | Mindes | 325—433 |

KATHLEEN H. CLAFFY, *Primary Examiner.*

DAVID G. REDINBAUGH, ROBERT S. ROSE, *Examiners.*

R. F. ROTELLA, S. BOR, R. LINN, *Assistant Examiners.*